Jan. 18, 1949.   J. J. ROZNER   2,459,290
PULLEY BLOCK AND BEARING ASSEMBLY
Filed Aug. 30, 1945   3 Sheets-Sheet 1
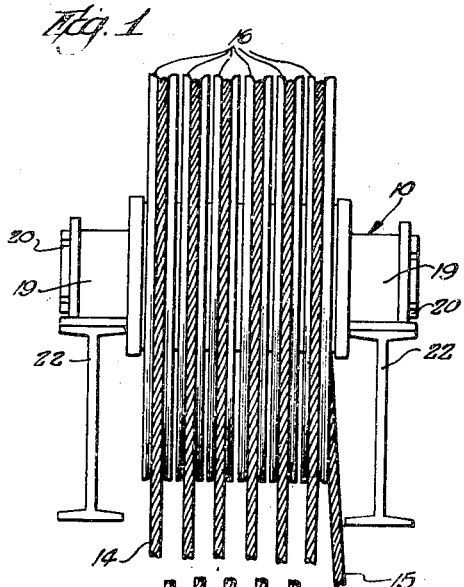
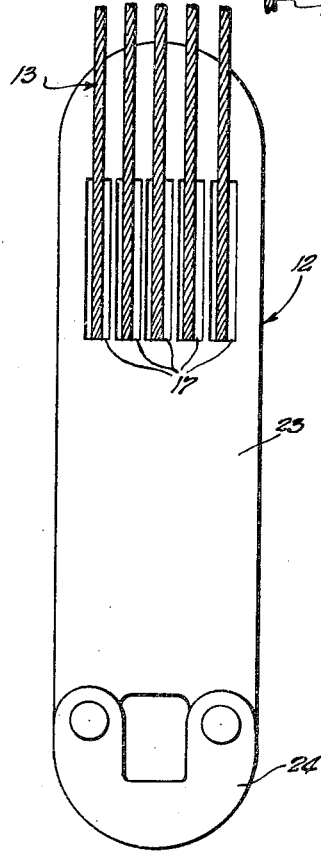
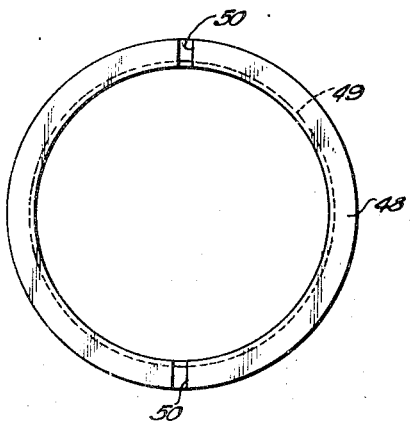
INVENTOR.
Joseph J. Rozner
BY
McCaleb, Wendt and Dickinson
Attys.

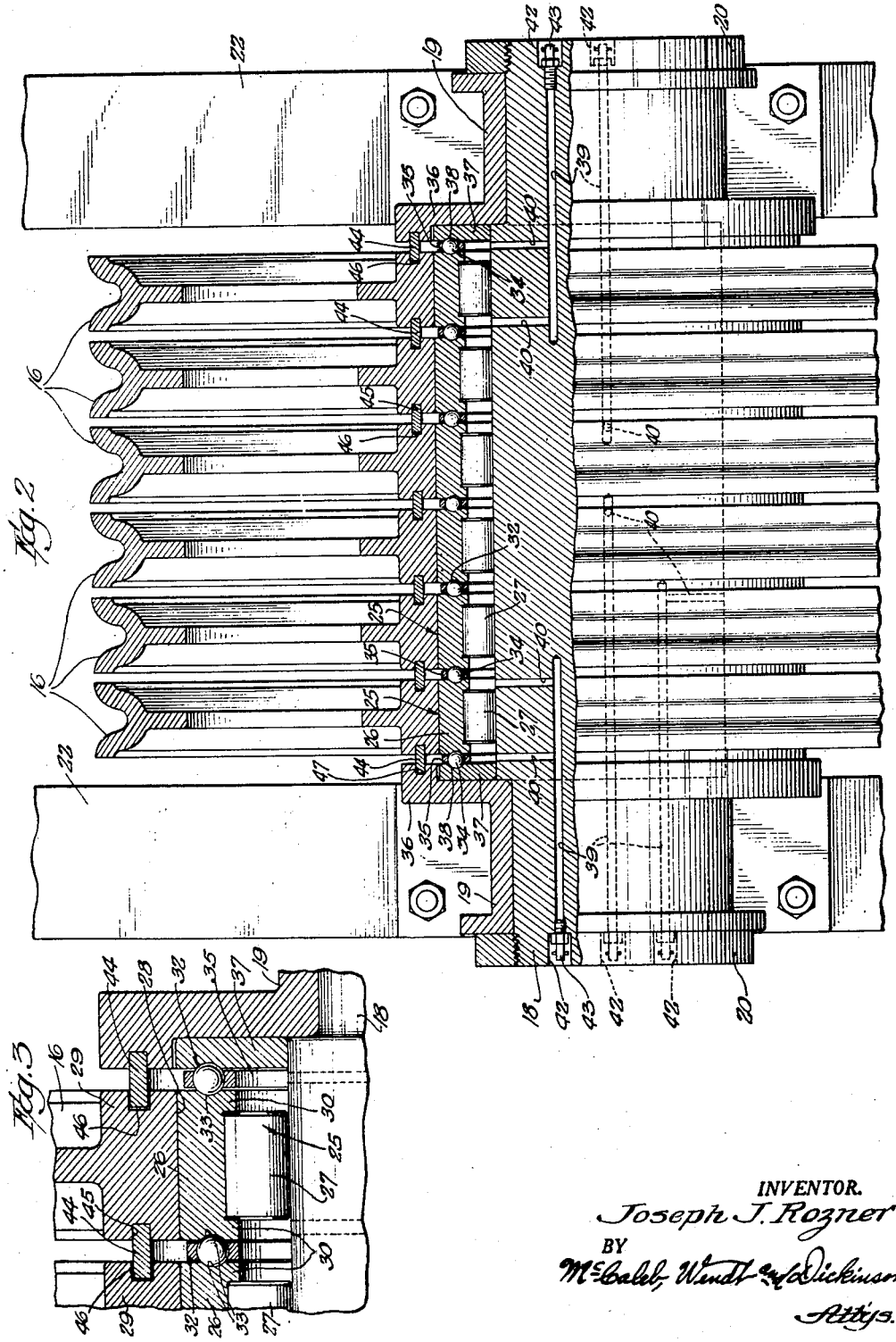

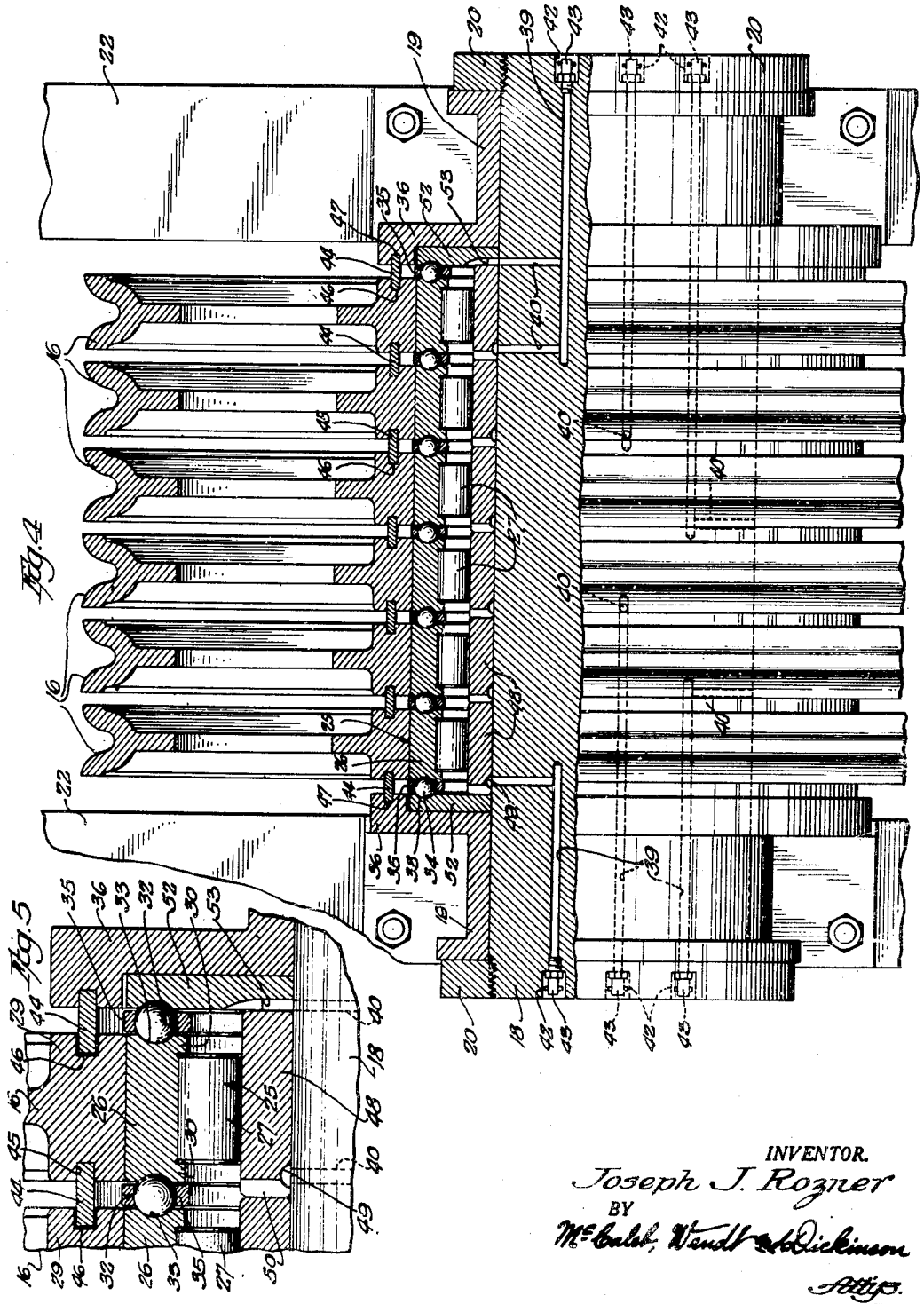

Patented Jan. 18, 1949

2,459,290

UNITED STATES PATENT OFFICE 2,459,290

PULLEY BLOCK AND BEARING ASSEMBLY

Joseph J. Rozner, Chicago, Ill., assignor to Aetna Ball & Roller Bearing Company, Chicago, Ill., a corporation of Illinois Application August 30, 1945, Serial No. 613,501

2 Claims. (Cl. 254—192)

This invention relates generally to pulley block and bearing assemblies, and more particularly to such assemblies adapted to heavy duty and large loads which include appreciable thrust components.

It is a general object of my present invention to provide an improved pulley block and bearing assembly which is devoid of excessive bulk and weight and adapted to withstand long service and subjection to heavy radial and thrust loads, such as those encountered in the crown and traveling blocks of oil well derricks.

In order to limit the bulk and weight of my pulley block and bearing assembly without sacrificing strength and efficiency, it is an object of my invention to provide a compact bearing assembly including separate anti-friction radial and thrust bearings utilizing some parts for dual purposes.

The invention has for another object the provision of an effective lubricating system for the bearings of a pulley block.

As another object, my invention comprehends the provision of an improved thrust bearing structure for a multiple pulley block.

Other objects and advantages of the invention will be apparent from the following description and the accompanying drawings in which similar characters of reference indicate similar parts throughout the several views.

Referring to the drawings of which there are three sheets:

Fig. 1 is a front elevational view of a crown block and a traveling block, both of which are adapted to incorporate the features of my invention;

Fig. 2 is a fragmentary top view partly in elevation and partly in longitudinal section and which depicts the structure of a preferred embodiment of my invention as applied to a crown block such as that shown in Fig. 1;

Fig. 3 is a fragmentary sectional view to an enlarged scale of a portion of the structure shown in Fig. 2;

Fig. 4 is a fragmentary top view similar to Fig. 2 and depicting a modification of my invention;

Fig. 5 is a fragmentary sectional view to an enlarged scale of a portion of the structure shown in Fig. 4;

Fig. 6 is an end elevational view of one of the parts of the bearing structure illustrated in Fig. 4; and Fig. 7 is an end elevational view of a preferred type of bearing part structure adapted to use in the bearings illustrated in either Fig. 2 or Fig. 4.

Having reference to the exemplary embodiments of my invention which are illustrated in the drawings, it is to be understood that although the invention is illustrated in its application to a crown block, the features of my invention are not limited to either crown or traveling blocks and the structure of the more salient parts is the same whether applied to a crown or a traveling block. The illustrative crown and traveling blocks which are depicted in Fig. 1 are exemplary of types of pulley blocks which are subjected to very heavy loads and which encounter large thrust forces in a direction transverse to the main load.

In addition to withstanding the heavy radial and thrust loads, it is particularly important and desirable that the bulk and weight of pulley blocks, such as the illustrated crown and traveling blocks, shall be minimized. Crown and pulley blocks of the type shown find their adaptation in oil well derricks and the like. In this adaptation a crown block 10 is mounted at the top of the derrick and a traveling block 12, which functions in association with the crown block, travels vertically through the derrick.

A cable 13 connects the crown and traveling blocks 10 and 12. One end, such as 14, of the cable is anchored to the traveling block while the other end 15 is connected to a winch or some suitable structure for applying the lifting force and thereby controlling the movements of the traveling block relative to the crown block. The intermediate portion of the cable 13 encompasses successive and independently rotatable sheaves 16 of the crown block 10 and sheaves 17 of the traveling block 12; the number of sheaves and the resultant number of intermediate strands of the cable are dependent upon factors including the desired mechanical advantage.

As illustrated in Figs. 1 and 2, the sheaves 16 of the crown block 10 are rotatably carried in side-by-side relationship on the mid-portion of a shaft 18, the ends of which shaft are secured in suitable flanged end support brackets 19 by fastening means such as nuts 20 threaded onto the ends of the shaft. The end support brackets 19 are secured to and carried by suitable structural elements such as the I-beams 22. Although not fully depicted in detail in the drawing, the mounting and support for the sheaves 17 of the traveling block are similar in structure and operation to those illustrated for the crown block and will be more fully described. As is usual, the traveling block 12 is enclosed in a suitable housing 23 and has a load-carrying link 24 secured to the bottom thereof.

Figs. 2 and 3 illustrate one preferred form of a bearing assembly adapted to the mounting of the sheaves 16 or 17 for rotation relative to the shaft 18 as well as for relative rotation with respect to one another. Since the bearings and parts for the mounting of each of the sheaves are similar, the description of a single bearing will suffice for the like parts of the others. Each of the sheaves is radially supported relative to the shaft 18 by a roller bearing 25. In the particular form of my invention which is illustrated in Figs. 2 and 3, the shaft 18 is hardened and serves as the inner race of each of the roller bearings. Each of the bearings 25 also includes an outer race 26 and a series of circumferentially disposed rollers 27. The outer race 26 is pressed into a central opening 28 in a hub 29 of the sheave. At each end of the inner surface of the outer race 26, an inwardly projecting flanged edge 30 is provided axially to retain the rollers 27. Although there are various known type of roller separators which might be utilized with the roller bearings disclosed to maintain a predetermined circumferential separation of the rollers, such separators have been omitted in the disclosed bearings.

Each bearing 25 supports its associated sheave for independent rotation relative to the shaft 18. In the design of the disclosed pulley block and bearing assembly, it has been considered undesirable to resist the encountered forces of axial thrust through the rollers 27. It may be noted that there are no shoulders or like structural elements on the surface of the shaft 18 to confine axial movements of the rollers 27 or to which axial thrust forces would be transmitted through the rollers. The rollers are kept in place axially only by the flanged edges 30 on the outer races.

Due to the magnitude of the axial thrust forces which the disclosed bearing assembly is adapted to encounter and resist, which thrust forces are due to causes such as the heavy loads carried and the angularity of the various cable strands, separate ball bearings 32 are utilized to transmit and resist the axial thrust forces in the assembly.

As depicted in Figs. 2, 3 and 7, each outer race 26 has its side edges ground and provided with an annular groove 33 of substantially arcuate section which serves as a ball race. In the disclosed assembly the outer races 26 of the separate bearings are of the same size and the annular grooves 33 in the sides of those races, which serve as ball races, are concentrically disposed in axial alignment. Series of balls 34 are disposed in the annular grooves between the side surfaces of adjacent bearings 25 to act as spacers between the adjacent bearings and as thrust transmitting elements. In the form depicted in Fig. 2, suitable spacer rings 35 retain the circumferentially spaced relationship of the balls of each series. As in the case of the rollers 27, the spacer rings 35 may be omitted.

At each end of the plurality of adjacent and axially spaced bearings and sheaves, a flanged rim 36 on the bracket 19 serves as an end support to resist the axial thrust forces. Axially within each of the flanged rims 36 and mounted upon the shaft 18, is a stationary end bearing race 37 having an annular ball race 38 of substantially arcuate section concentrically disposed with respect to the ball races in the sides of the bearing races 26 and facing inwardly toward the bearing assembly to retain a series of balls 34 similar to those utilized between the bearing races. Thus, it may be understood that the thrust forces of each end of all the sheaves are transmitted through the ball bearings 34 and outer races 26 to either or both of the end supports provided by the flanged rims 36.

Both the radial and thrust bearings of the disclosed assembly are lubricated by a common means which includes communicating axial and radial lubricant passages 39 and 40, respectively, in the shaft 18. Desirably, there is an axial passage 39 and a communicating radial passage 40 opening into each space between adjacent bearings 25. However, in my disclosed embodiment two radial passages communicate with one of the axial passages at each end of the shaft so as to lubricate the end bearings through the same axial passages through which lubricant is supplied to the adjacent space between bearings. At the ends of the shaft 18, the axial passages 39 terminate in the recesses 42 in which suitable fittings 43 are mounted for connection with a grease gun or the like.

Leakage of lubricant from the bearings 25 and between the sheaves is prevented by annular rings 44. Each of the rings 44 is concentrically disposed with respect to the axis of the shaft and is secured in a recess in one side of each sheave hub 29. The ring which is secured to each sheave projects axially into a recess 46 in the adjacent sheave and has a running fit in the latter recess. For uniformity of assembly, the rings are secured in the same side of each of the sheaves and have a running fit in the groove in the opposite side of the adjacent sheave. At one end the ring 44 is carried by the flanged rim 36 of the support bracket and has a running fit in the groove 46 of the adjacent sheave; while at the other end of the assembly the ring carried by the end sheave has a running fit in a groove 47 in the adjacent flanged rim 36.

In the modification of my invention which is depicted in Figs. 4 and 5, the general structure and arrangement of the parts is similar to that shown in Fig. 2. Reference numerals similar to those utilized in the description of Fig. 2 refer to like parts. The main differences of the structures illustrated in Figs. 2 and 4 result from the provision of inner races 48 for the roller bearings in the form shown in Fig. 4, rather than utilizing the surface of the shaft to provide the inner races as illustrated in Fig. 2. By preference, the inner races 48 are mounted on the shaft 18 in end-to-end relationship and abutting one another. Each roller bearing has its separate and separately replaceable inner race.

The provision of the separate inner races in the disclosed abutting relationship requires certain provisions in the structure of the inner races to provide for the lubrication of the bearings and also necessitates a change of the structure of one of the end races to facilitate the lubrication of one of the end bearings. In the preferred form of my inner race which is illustrated in Figs. 4, 5 and 6, an annular groove 49 is provided near one end of the inner surface of the race. Diammetrically opposed slots 50 in the end surfaces of the inner races communicate with the annular groove and permit the passage of lubricant from the annular groove to the inner surfaces of the bearing.

Like the form disclosed in Fig. 2, axial and radial lubricant passages 39 and 40, respectively, are provided in the shaft 18. In the form disclosed in Fig. 4, the positions of the radial passages are such that they communicate with the annular grooves in the inner surfaces of the races. In order to provide for uniform assembly, the inner races are mounted with the annular grooves of one race adjacent the ungrooved end of the adjacent race.

In order to avoid the use of a specially made inner race, at one end of the bearing assembly so as to permit the passage of lubricant to one of the end bearings, an end race 52 is provided with a channel 53 in its inner surface, which channel communicates with a radial lubricant passage 40 in the shaft for the flow of lubricant to the end bearing surfaces.

In both forms of my bearing assembly, normal end clearances, together with endwise freedom of the rollers 27 relative to one of their races (shaft 18 in Fig. 2 and races 48 in Fig. 4) allows effective compensation of thrust bearing loads due to deflection of the shaft. That is, if the total load carried by the shaft 18 is sufficient to produce an appreciable deflection, the tendency would normally be to overstress some of the thrust balls 34. Such deflection, however, in either of the bearing assemblies of Figs. 2 and 4 is distributed between the several thrust bearings 32 as a result of endwise movement of the rollers 27.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a multiple pulley block and bearing assembly, the combination comprising a shaft; substantially rigid support means secured to and carrying the ends of the shaft; a plurality of sheaves having hubs; bearing means supporting the sheaves in side-by-side relationship upon the shaft for rotation relative thereto and relative to one another, said bearing means for each of the sheaves including an outer roller race secured in the hub of the sheave and having integral end flanges thereon extending inwardly in a radial direction, a plurality of rollers mounted within each of said races and axially positioned between said end flanges, means providing inner races for said rollers so that the radial forces of the sheaves are carried thereby, said outer roller races having adjacently disposed annular ball bearing races in the ends thereof, end thrust ball race rings carried by said substantially rigid support means at opposite ends of the plurality of outer races and having ball bearing races therein aligned with the ball races in the ends of said outer races, series of ball bearings mounted between said adjacently disposed ball races and between said end thrust ball race rings and the adjacent outer races so that end thrust forces are transmitted to and carried by said substantially rigid support; spacer rings for each series of ball bearings for maintaining the ball bearings of each series in relatively uniform circumferentially spaced relationship; means comprising a series of annular rings individually carried by the support means at one end of the plurality of sheaves and by each of said sheaves and extending into annular recesses in adjacent ones of the sheaves and the support means at the other end of the plurality of sheaves for retaining lubricant around said bearings; and means including a plurality of passages in said shaft in approximate alignment with each of said series of ball bearings for lubricating the bearings.

2. In a multiple pulley block and bearing assembly as defined in claim 1, said means providing inner races for the rollers comprising a series of inner roller races of like construction and similarly disposed in end-to-end relationship upon said shaft, each of said inner races having a lubricant passage therein at one end communicating with one of said passages in the shaft, and one of said end thrust ball race rings having a lubricant groove in the inner end surface thereof communicating with one of said passages in the shaft at the end of the adjacent inner roller race opposite said lubricant passage therethrough.

JOSEPH J. ROZNER.

REFERENCES CITED

The following references are of record in the file of this patent:

UNITED STATES PATENTS

| Number | Name | Date |
|---|---|---|
| 949,928 | Grooms | Feb. 22, 1910 |
| 1,668,497 | Fishback | May 1, 1928 |
| 1,713,586 | Wright | May 21, 1929 |
| 2,180,541 | Nichols | Nov. 21, 1939 |
| 2,208,724 | Griswold | July 23, 1940 |
| 2,274,099 | Smith et al. | Feb. 24, 1942 |